United States Patent [19]
Kikuchi et al.

[11] Patent Number: 5,606,445
[45] Date of Patent: Feb. 25, 1997

[54] OPTICAL TRANSMISSION SYSTEM

[75] Inventors: Nobuhiko Kikuchi, Tokyo; Shinya Sasaki, Kodaira, both of Japan

[73] Assignee: Hitachi, Ltd., Tokyo, Japan

[21] Appl. No.: 298,020

[22] Filed: Aug. 30, 1994

[30] Foreign Application Priority Data

Sep. 3, 1993  [JP]  Japan .................. 5-219538

[51] Int. Cl.$^6$ .................................. H04B 10/18
[52] U.S. Cl. .................................. 359/161; 359/173
[58] Field of Search .................. 359/161, 173, 359/188, 195

[56] References Cited

U.S. PATENT DOCUMENTS 5,392,147  2/1995  Kaede ........................ 359/187
5,430,568  7/1995  Little ........................ 359/161

OTHER PUBLICATIONS

"Nonlinear Fiber Optics", Academic Press, 1992, (ISBN 0–12–045140–9), pp. 75–91 (see Specification p. 2).

Technical Reports of Institute of Electronics, Information and Communication Engineers (Japan) OCS 92–52, by Kikuchi, et al., Electronic Communication Information Society (1992), pp. 69–74 (see Specification p. 2).

Primary Examiner—Leslie Pascal
Attorney, Agent, or Firm—Kenyon & Kenyon

[57] ABSTRACT

In an optical transmission system, SPM influences on the degradation of wave forms are canceled by setting an amount of compensation of a dispersion compensator at about 50% of the total amount of dispersion of an optical fiber transmission line so that a received wave form is substantially not varied, even if light intensity is varied. When a plurality of dispersion compensator are used, the number of compensators is optimized by setting the arrangement interval in the vicinity of the receiving end to a small value. Further, in a transmission line, in which amounts of dispersion of optical fibers have positive and negative fluctuations, the smallest transmission distance of a transmission system is increased by effecting dispersion compensation so that an expected value of the total amount of dispersion of the transmission line is abnormal dispersion.

5 Claims, 8 Drawing Sheets

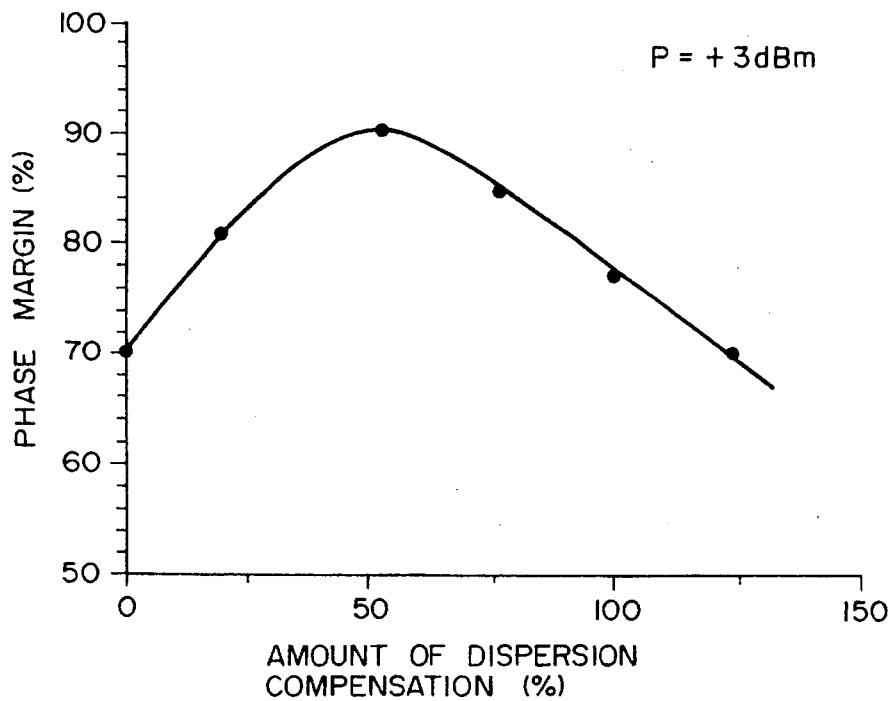
FIG. 7
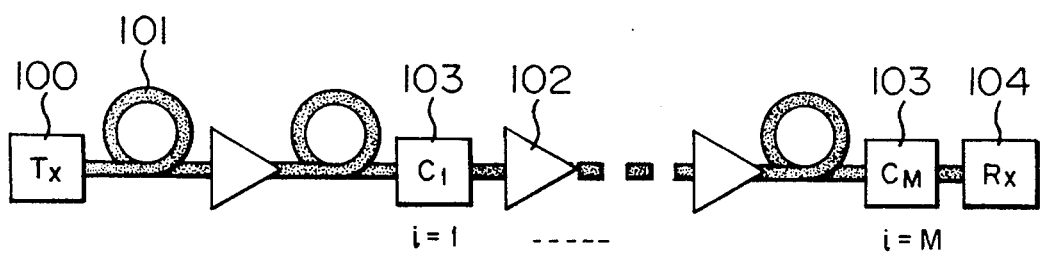

▭ +3.5ps/nm/km (ANOMALOUS DISPERSION)
▭ −3.5ps/nm/km (NORMAL DISPERSION)

▭ +3.5ps/nm/km
▭ −3.5ps/nm/km

OPTICAL TRANSMISSION SYSTEM

BACKGROUND OF THE INVENTION

The present invention relates to an optical transmission system using an IM (Intensity Modulation) method, which is one type of optical fiber communication methods.

Recently in the field of optical fiber communication, increase in signal transmission speed and increase in transmission distance have been rapidly developed. One of the most important factors restricting the transmission distance in such a superhigh speed/long distance transmission is "dispersion" due to optical fiber. Dispersion is a phenomenon, by which lights having different wavelengths are transmitted with different speeds in the optical fiber. Optical spectre of light signals modulated with a high speed contains components having different wavelengths and these components having different wavelengths reach a receiving end at different points of time under influences of the dispersion. It is known that, as the result, large waveform distortion takes place in light waveform after the transmission. A method called dispersion compensation is conceived as a method for avoiding such influences of dispersion. This is a method for preventing waveform distortion after the transmission, by which mediums (optical fiber or grating) having dispersion characteristics opposite to those of the transmission line are inserted into the course thereof so that the mean dispersion of the transmission line is approximately zero.

On the other hand, nonlinear effects of the optical fiber are known as another factor restricting the transmission distance for optical fiber communication. In particular, in the optical transmission by the intensity modulation method, self phase modulation (hereinbelow abbreviated to SPM) effect, which is one of the nonlinear effects of the optical fiber, gives rise to a serious problem. SPM is a phenomenon, by which a refractive index of the optical fiber varies pro-portionally to variations in the intensity of optical signals, and as the result, extra phase modulation, i.e. frequency chirp (variations in light frequency), is superposed on the light signals in the optical fiber. Light signals having such frequency chirp give rise to important waveform variations after the transmission because of influences of the dispersion, which the optical fiber has. Such influences of SPM is reported in ① "Nonlinear Fiber Optics", Academic Press, 1992, (ISBN 0-12-045140-9), ② Technical Reports of Institute of Electronics, Information and Communication Engineers (Japan) OCS92-52, by Kikuchi, et al., Electronic Communication Information Society (1992), etc.

Heretofore several examples, in which the dispersion compensation is effected, have been reported, also in case where influences of SPM are great. However, the dispersion compensation has been effected therein merely so that the dispersion of the whole transmission line is zero just as in the prior art techniques. Further influences, which the SPM has on the dispersion compensated transmission, are almost not studied.

SUMMARY OF THE INVENTION

The object of the present invention is to provide an optical transmission system using dispersion compensation method, taking influences of SPM into account.

Denoting the light intensity in the optical fiber at a point Z displaced from an optical transmitter by a distance z by $P(z)$ and the amount of dispersion from the point Z to an optical receiver (including dispersion of the optical dispersion compensator) by $D(z)$, the above object can be achieved by setting the position of the optical dispersion compensator and the amount of dispersion so that a value obtained by integrating a product $P(z) \cdot D(z)$ from $z=0$ to L is approximately zero.

Particularly, in the case where a plurality of optical dispersion compensators are used, denoting a point directly after the i-th optical dispersion compensator counted from the optical transmitter by $Z_i$ and the amount of dispersion from the point Z to the point $Z_i$ (including dispersion of the optical dispersion compensator) by $D_i(z)$, the object can be achieved by setting the positions of the optical dispersion compensators and the amounts of dispersion so that values obtained by integrating products $P(z) \cdot D_i(z)$ from $z=0$ to $Z_i$ are approximately zero for all i.

Further, in case where an optical dispersion compensator is disposed before the optical transmitter, it can be achieved by setting the amount of dispersion C of the dispersion compensator so as to be approximately $\{1/(aL)-(N+1)/(2N)\}$ times as great as the amount of dispersion B of the transmission line (where a is the loss factor of the optical fiber, L is the total transmission distance, and N is the number of fiber sections).

It can be achieved also by disposing dispersion compensators in the neighborhood of the receiving end so that arrangement interval therebetween is smaller than that between dispersion compensators in the neighborhood of the transmitting end. It can be achieved more efficiently particularly by disposing dispersion compensators at such positions that distortion in waveform directly before different dispersion compensators are in accordance with each other. Further, in case where the amount of dispersion in different fiber sections and the optical output intensity of different optical amplifier are almost constant and the influences of SPM are great, it can be achieved by setting the interval $1_i$ between i-th and (i+1)-th dispersion compensators so as to be approximately $\{\sqrt{i}-\sqrt{(i-1)}\}$ times as great as $1_1$, being the interval between the optical transmitter and the first dispersion compensator.

Furthermore it can be achieved by disposing dispersion compensators at two positions, i.e. directly after the optical transmitter and directly before the optical receiver, and by transmitting signals after having enlarged satisfactorily the width of the light waveform by means of the first dispersion compensator with respect to the width of the light waveform to be transmitted.

In the case where dispersions of optical fibers constituting different fiber sections have statistical fluctuations to a certain extent, the object can be achieved by effecting dispersion compensation so that an expected value of the total dispersion including dispersion produced by dispersion compensators in the course of the transmission line is positive dispersion (anomalous dispersion). Specifically when denoting the transmittable distance by L, in the case where all the amounts of dispersion of optical fiber sections are minimum and dispersion compensation is zero, and a positive dispersion compensation, by which transmission over the distance L is made possible, by C, in the case where all the amounts of dispersion of optical fiber sections are maximum, the object can be achieved by setting the amounts of dispersion compensation of the dispersion compensators in a region between 0 and C. It can be achieved more efficiently particularly by setting the amounts of dispersion compensation so that distortion in waveform after the transmission are approximately in accordance with each other in two cases where dispersions in all the optical fibers are minimum and where dispersions in all the optical fibers are maximum.

Further, even in the case where transmission is effected by using a zero dispersion wavelength in the transmission line, the object can be achieved by effecting dispersion compensation. It is achieved by compensating deviation of dispersion of the transmission line as follows. Denoting the light intensity in the optical fiber at a point Z far from an optical transmitter by a distance z by P(z) and the amount of dispersion from the point Z to an optical receiver (including dispersion of the optical dispersion compensator) by D(z), the above object can be achieved by setting the position of the optical dispersion compensator and the amount of dispersion so that a value obtained by integrating a product P(z)·D(z) from z=0 to L is approximately zero. In the case where dispersions have statistical fluctuations to a certain extent, the object can be achieved also by effecting positive dispersion compensation. Furthermore, in the case where a transmission section, which is the first half of the transmission line, has the smallest dispersion, while the other transmission section, which is the second half of the transmission line, has the greatest dispersion, the object can be achieved more efficiently by setting the amounts of dispersion so that worsenings in waveform of the received wave in the two sections are approximately in accordance with each other.

Frequency chirp produced by SPM is generated, distributed over the whole length of the transmission line and subjected to dispersion after the generation point, which gives rise to a worsening of the waveform. Averaged over the whole length of the transmission line, the center of generation points of SPM is almost in the neighborhood of the center of the transmission line, in the case where the number of fiber sections N is sufficiently great. Consequently by effecting dispersion compensation for an approximately half of the amount of dispersion of the transmission line it is possible to reduce dispersion, to which the SPM is subjected, equivalently to zero. In this way, for example, even if the intensity of light output of a optical amplifier is varied, it is possible that received waveform is not varied.

Further, since the frequency chirp produced by SPM is accumulated during transmission, variations in optical waveform are produced more easily by influences of dispersion in the second half of the transmission line. Therefore, in the case where a plurality of dispersion compensator are provided, it is possible to increase the dispersion compensation effect by decreasing the arrangement interval with decreasing distance from the receiving end. In addition, in the case where dispersion compensation is effected, taking influences of SPM into account, if the waveform is changed remarkably during transmission, it is impossible to restore the original waveform even after the dispersion compensation. However it is disadvantageous in cost to increase excessively the number of dispersion compensators. Therefore, it is possible to optimize the number of dispersion compensators by inserting a dispersion compensator every time when worsening of the waveform after the transmission reaches a predetermined value.

Since worsening of the waveform by SPM is proportional to the magnitude of intensity modulated components, which transmitted waveforms have, it is possible to suppress influences of the SPM by inserting a dispersion compensator directly after the optical transmitter and effecting transmission after having increased sufficiently the width of light waveforms with respect to the width of light waveforms to be transmitted.

In the case where dispersions of optical fibers constituting different fiber sections have statistical fluctuations in a certain extent, the smallest transmission distance of the transmission system is restricted usually when all dispersions of the transmission line are fluctuated on the negative dispersion side. Consequently, it is possible to increase the smallest transmission distance of the transmission system by effecting dispersion compensation so that an expected value of the total dispersion is positive dispersion (anomalous dispersion). In particular, the smallest transmission distance of the transmission system can be increased at most by setting the amounts of dispersion compensation so that worsenings of the waveform after the transmission are approximately in accordance with each other in two cases where dispersions in all the optical fibers are minimum and where dispersions in all the optical fibers are maximum.

Also in the case where transmission is effected by using a zero dispersion wavelength in the transmission line, it is possible to reduce worsening of the waveform by SPM and to increase the transmission distance by compensating deviations in the dispersion of the transmission line by using dispersion compensation. Further, even in the case where there are statistical fluctuations to a certain extent in the dispersion, it is possible to increase the smallest transmission distance of the transmission system by effecting dispersion compensation on the positive dispersion side.

BRIEF DESCRIPTION OF THE DRAWINGS

FIG. 6 indicates a relationship between the amount of dispersion compensation and the phase margin of received waveforms;

FIG. 7 is a diagram showing a construction representing a third embodiment of the present invention;

DESCRIPTION OF THE PREFERRED EMBODIMENTS

Figure 1:
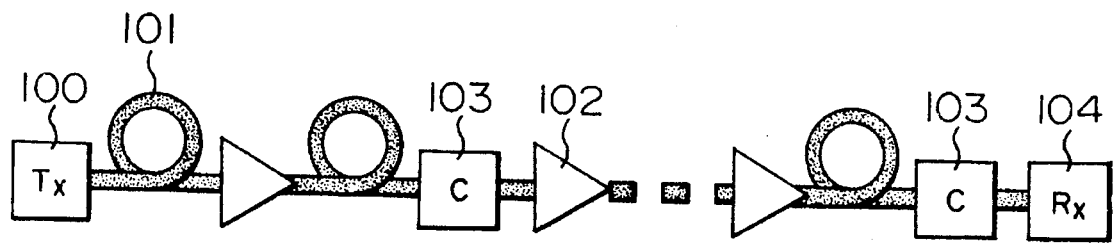
FIG. 1 is a diagram showing a construction representing a first embodiment of the present invention.

FIG. 1 is a diagram showing a construction representing a first embodiment of the present invention. Intensity modulated light transmitted by an optical transmitter 100 is transmitted through a transmission line, in which optical fibers 101 and optical amplifiers 102, are arranged alternately. One or a plurality of dispersion compensators 103 are disposed in the course of the transmission line and transmitted light signals are received by an optical receiver 104. The figure shows an example, in which two dispersion compensators 103 are disposed.

In a prior art dispersion compensated transmission the amount of dispersion compensation C of each dispersion compensator is set so as to compensate the dispersion of the optical fiber directly preceding the relevant dispersion compensator so that the total amount of dispersion of the transmission line including the dispersion compensators is zero. In such a prior art dispersion compensated transmission influences of the worsening or degradation of the waveform by SPM are not taken into account.

On the contrary, according to the present invention, denoting the light intensity in the optical fiber at a point Z for displaced from a transmitting end by a distance z by P(z) and the amount of dispersion of the transmission line (including dispersion of the dispersion compensator) from the point Z to the optical receiver 104 by D(z), the value of C and the position of the dispersion compensator are so set that the integral of a product P(z)·D(z) from z=0 to L is approximately zero. In this way, transmission, in which influences of the SPM, which is a nonlinear effect produced in the optical fiber, are approximately cancelled, is made possible. The reason therefor can be explained as follows.

Figure 2:
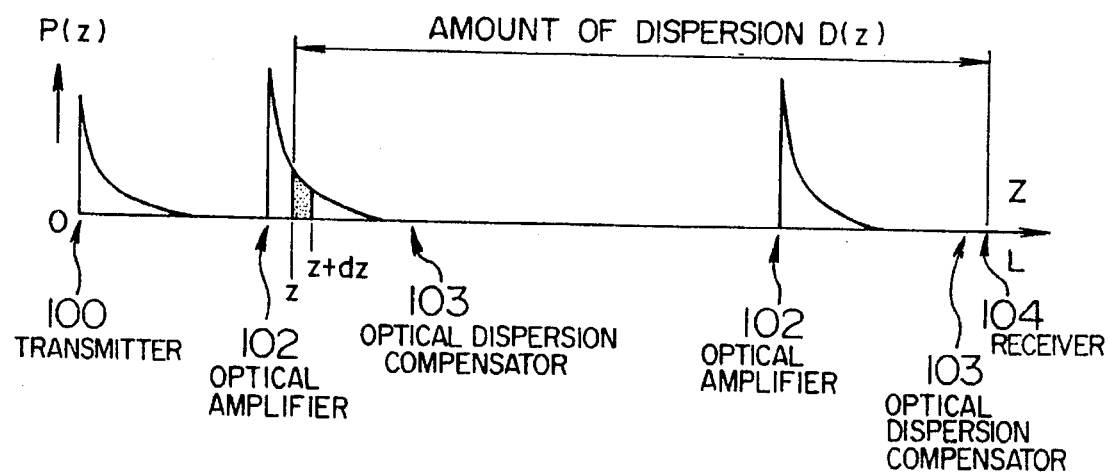
FIG. 2 is a diagram indicating light intensity distribution in an optical fiber transmission line.

FIG. 2 shows light intensity distribution P(z) in the optical fiber transmission line. Since the magnitude of frequency chirps produced by SPM in the course of the optical fiber is proportional to the light intensity in the optical fiber, it is distributed as indicated in FIG. 2. It is conceivable that these frequency chirps give rise to worsening of the waveform after the transmission under influences of the amount of dispersion D(z) between the generation point z and the optical receiver 104. By the method indicated in the reference—described previously it is conceivable that worsening of the waveform is proportional to a value obtained by integrating the product P(z)·D(z) from the transmitting end to the receiving end. Consequently it is possible to reduce the worsening of the waveform by SPM almost to 0 by effecting dispersion compensation so that this values is almost 0. This condition can be expressed as indicated by Eq. (1).

$$\int_0^L [P(Z) \cdot D(Z)] dZ = 0 \qquad \text{Eq. (1)}$$

A value obtained by dividing the left side of this equation by the mean light intensity represents the amount of dispersion from the averaged center (center of gravity) of the frequency chirps produced by SPM to the receiving end. Eq. (1) means that compensation is effected so that this value is zero, i.e. the averaged amount of dispersion, to which the frequency chirps by SPM is subjected, is zero. It is possible to compensate approximately completely influences of SPM by effecting dispersion compensation in this way.

Figure 3:
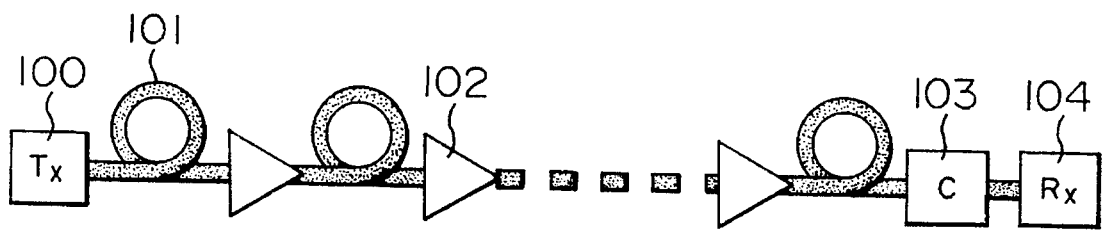
FIG. 3 is a diagram showing a construction representing a second embodiment of the present invention.
Figure 4:
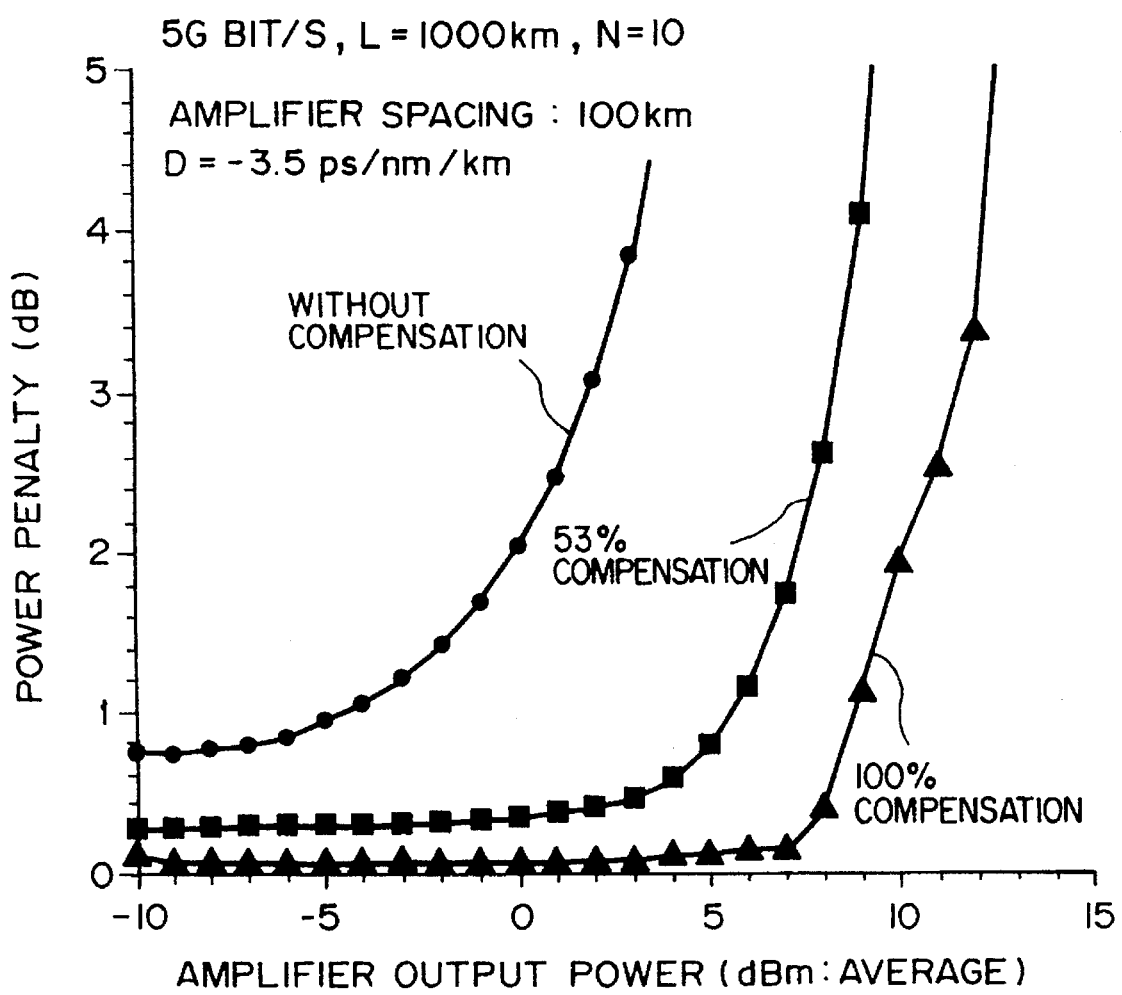
FIG. 4 shows a relationship between light output of an optical amplifier and an eye opening penalty of received waveform.
Figure 5A:
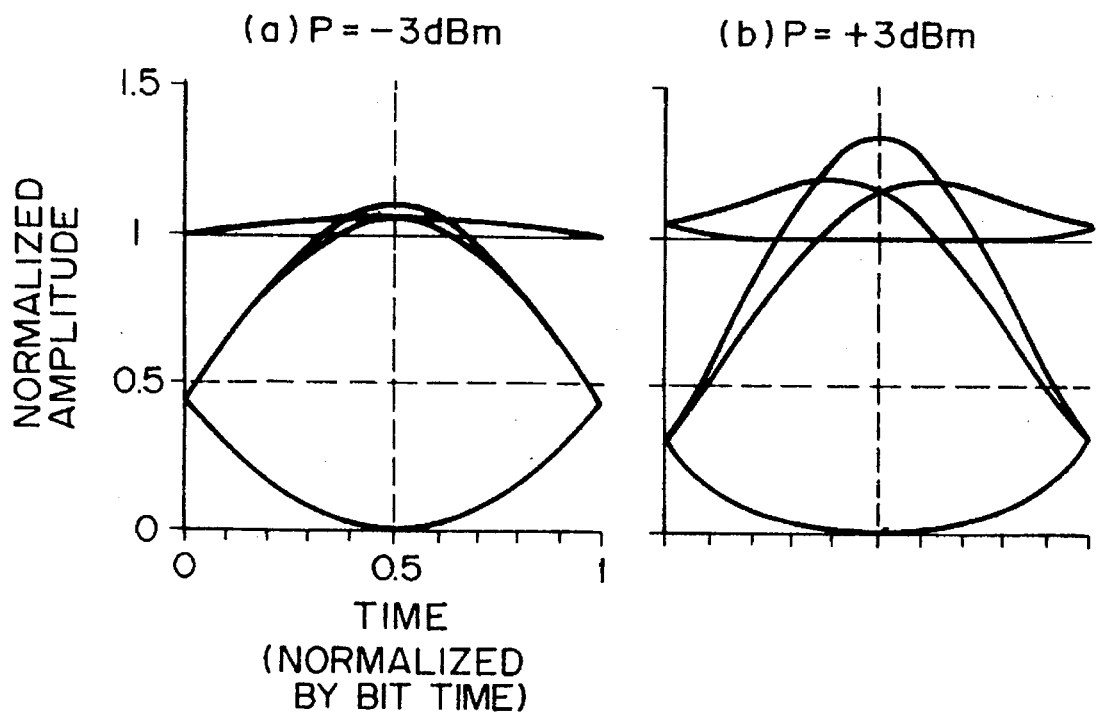
FIGS. 5A and 5B show eye patterns of received waveforms.
Figure 5B:
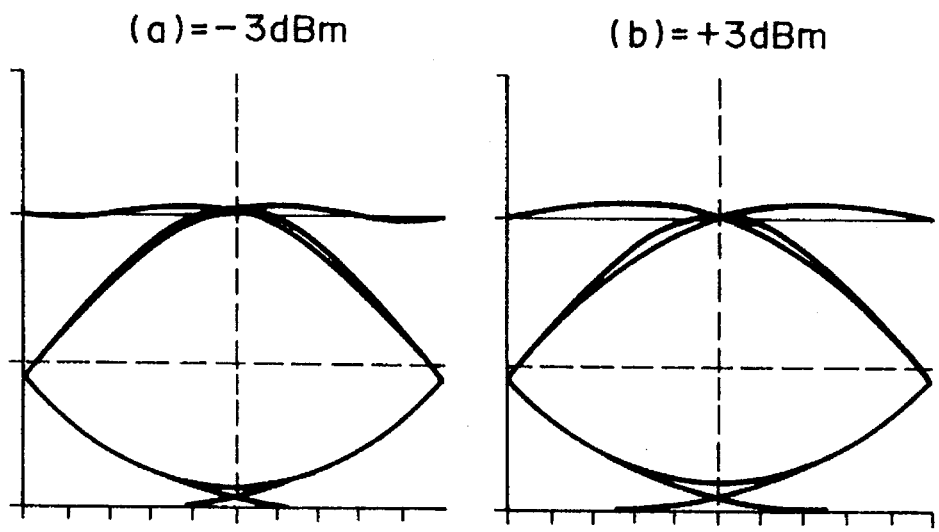

FIG. 3 shows a second embodiment of the present invention, which is an example in which only one dispersion compensator 103 is used, which is disposed before the optical receiver 104. In the present embodiment, denoting the total amount of dispersion of the transmission line by B, the value of the amount of dispersion compensation C is given approximately by Eq. (2), $$C = \left( \frac{1}{aL} - \frac{N+1}{2N} \right) \cdot B \qquad \text{Eq. (2)}$$

where a is the loss factor of the optical fiber, L is the total transmission distance, and N is the number of fiber sections. The above equation is an approximate solution obtained by solving Eq. (1), assuring that light output intensities of the optical transmitter 100 and the optical amplifier 102 are approximately equal to each other. For example, letting a=0.25 dB/km, L=1000 km, and N=10, the amount of dispersion compensation in the present embodiment is about 53% (the sign being reversed) of the total amount of dispersion of the transmission line. FIG. 4 shows an aspect of variations in an eye opening penalty of the received waveform with respect to the light output intensity of the optical amplifier, using the amount of dispersion compensation as a parameter. In this calculation it is assured that bit rate is 5 Gbps, total transmission distance L=1000 km, N=10, amount of dispersion of optical fiber D=−3.5 ps/nm/km. The three curves in FIG. 1 indicate effects without compensation, with 53% compensation (by the present method), and with 100% compensation (by the prior art method), respectively. It is confirmed that in the two examples, in which dispersion compensation is effected, eye opening worsening after the transmission is suppressed to a small value, even in a region where light output intensity is high (influences of SPM being great), with respect to the case where no dispersion compensation is effected. From this figure it seems that eye opening worsening is smaller in the example, in which 100% compensation is effected, than in the case where 53% compensation is effected. However, this is because in the case of the 100% compensation influences of SPM are not cancelled and compression of the transmitted waveform takes place by the effects of SPM. This aspect can be confirmed from the eye patterns of the received waveform indicated in FIGS. 5A and 5B. FIG. 5A shows the example of 100% compensation, where (a) and (b) indicate eye patterns of the received waveform for light output intensities of −3 dBm and +3 dBm, respectively. It can be verified that great waveform compression takes place and the received waveform is varied remarkably, when light output increases. On the contrary, in the example of 53% compensation by the present method indicated in FIG. 5B, it can be confirmed that the received waveform is almost not changed, even in the case where light intensity is varied, because influences of SPM are approximately cancelled. As described above, since the received waveform doesn't vary by the present method even if the light output intensity is varied, advantages are obtained that setting of a discrimination level of the optical receiver is easy and that phase margin of the received waveform increases. FIG. 6 shows a relationship between the amount of dispersion and the phase margin of the transmitted waveform. It can be verified that the phase margin is the greatest in the neighborhood of the 53% dispersion compensation by the present method. Further it can be verified that the present invention is efficient in a region of the dispersion compensation from 20% to 80%.

Further, particularly in case where the dispersion, the section length, etc. of the different fiber sections are not constant, necessary amounts of dispersion compensation can be calculated, using Eq. (3).

$$C = \frac{\sum_{i=1}^{N} P_i \cdot \{D_i/a - (D_i \cdot l_i + \ldots + D_N \cdot l_N)\}}{\sum_{i=1}^{N} P_i} \cdot B \quad \text{Eq. (3)}$$

where $P_i$ is the light intensity inputted to an i-th fiber section counted from the transmitting side, and $D_i$ and $L_i$ are the amount of dispersion and the length of the fiber in the i-th section.

FIG. 7 shows a third embodiment of the present invention, which is an example, in which a plurality of dispersion compensators 104 are arranged, distributed in a transmission line. In this case the highest efficiency can be obtained by setting the dispersion compensators so that the condition described previously to cancel SPM is satisfied directly after each of them. That is, denoting the number of dispersion compensators by M; the position of an i-th dispersion compensator counted from the optical transmitter 100 (distance from the transmitting end) by $z_1$; the amount of compensation by $C_i$; the light intensity in the optical fiber at a point Z far from the transmitting end by a distance z by $P(z)$; and the amount of dispersion between the points Z and $z_i$ by $D_i(z)$, the value of $C_i$ and the position of the relevant dispersion compensator are so set that a value obtained by integrating a product $P(z) \cdot D_i(z)$ from z=0 to $z_i$ is approximately zero for all i. In this way transmission is possible by which influences of SPM, which are nonlinear effects produced in the optical fiber, are approximately cancelled.

Figure 8:
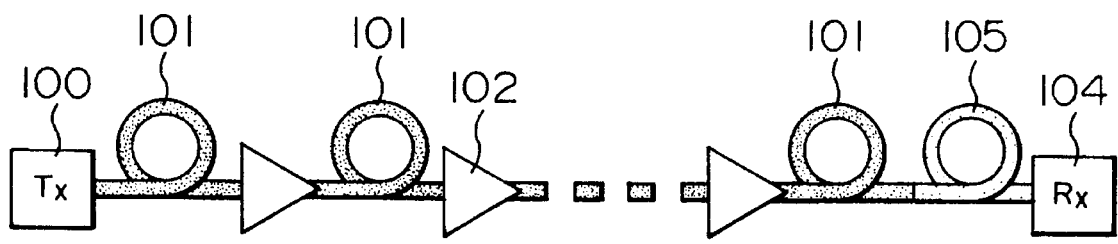
FIG. 8 is a diagram showing a construction representing a fourth embodiment of the present invention.
Figure 9:
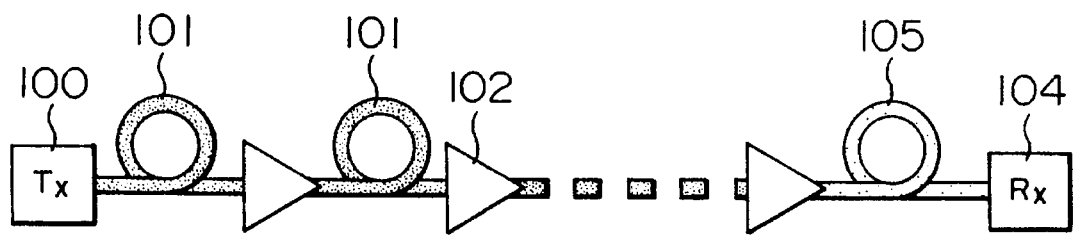
FIG. 9 is a diagram showing a construction representing a fifth embodiment of the present invention.

For the dispersion compensators used for realizing the present invention any optical element having dispersing characteristics can be used. As examples of such an optical element there are an optical element using reflection by grating pair or grating, an optical element using a Fabry-Perot interferometer, a Mach-Zehnder interferometer, etc., an element using dispersing characteristics of an absorption edge of an optical semiconductor device, etc. Further it is also possible to use an optical fiber having dispersing characteristics opposite to those of the transmission line as a dispersion compensating element. Particularly in case where a transmission wavelength of 1.55 µm is used, it is efficient to use an optical fiber having a zero dispersion wavelength at 1.3 µm, etc. as a dispersion compensating fiber. A fourth embodiment (FIG. 8) and a fifth embodiment (FIG. 9) of the present invention are examples, in which dispersion compensating fiber 105 itself is used as a constituent element of a part or the whole of the transmission line or the fiber sections. The present method is efficient also in the case where influences of SPM within the dispersion compensating fiber cannot be neglected and the amount of dispersion compensation can be calculated by the method identical to that described above.

Figure 10:
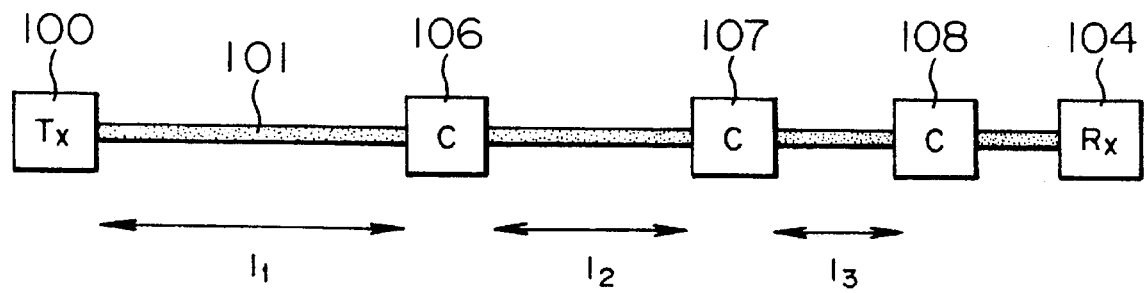
FIG. 10 is a diagram showing a construction representing a sixth embodiment of the present invention.

FIG. 10 shows a sixth embodiment of the present invention, which indicates the optimum arrangement of dispersion compensators. The figure shows an example, in which there are disposed three dispersion compensators. In this figure optical amplifiers are omitted. By the prior art method it was thought that the interval between consecutive dispersion compensators is constant. However, in the present embodiment, denoting the interval between the optical transmitter and the first dispersion compensator by $l_1$, the interval between the first dispersion compensator and the second dispersion compensator by $l_2$, and the interval between the second dispersion compensator and the third dispersion compensator by $l_3$, the dispersion compensators 106, 107 and 108 are arranged so that $l_1 \geq l_2 \geq l_3$. The reason therefor is as follows. For example, even if a case where dispersion compensation is effected so that worsening of the waveform after the transmission is reduced to zero by means of each of the dispersion compensators is taken into account, although worsening of the waveform can be compensated, frequency chirp by SPM cannot be cancelled, but it is accumulated during transmission. Therefore it is possible to decrease the number of necessary dispersion compensators by decreasing the interval between consecutive dispersion compensators with decreasing distance from the receiving end. In this case the amount of compensation may be set so as to compensate 100% of the amount of dispersion of the directly preceding transmission fiber section and also to cancel influences of SPM as indicated in the embodiment described above of the present invention.

In the case where the number of dispersion compensators is optimized, it is most suitable to arrange dispersion compensators so that worsenings in waveform directly before different dispersion compensators are in accordance with each other. That is, a first dispersion compensator is arranged at a position where worsening of the waveform in the optical fiber transmission line reaches a predetermined value to remedy the worsening of the waveform and thereafter the succeeding dispersion compensator is inserted at a point where it reaches again the predetermined value. By repeating this process it is possible to obtain the greatest transmission distance with a given number of dispersion compensators. As a method for evaluating the amount of worsening of the waveform, e.g. a point where the width of the received waveform is increased by 10% or a point where the amount of eye opening worsening is 1 dB may be adopted. In particular, in case where the worsening in waveform by SPM limits the transmission distance, the arrangement of dispersion compensators can be optimized by setting the interval $l_i$ of the i-th dispersion compensator so as to be $\{\sqrt{i} - \sqrt{(i-1)}\}$ times as great as $l_1$.

Figure 11:
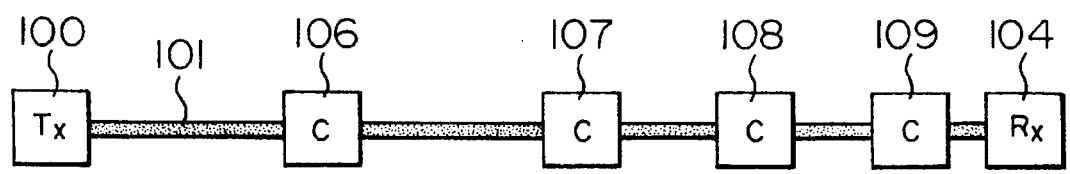
FIG. 11 is a diagram showing a construction representing a seventh embodiment of the present invention.

FIG. 11 shows a seventh embodiment of the present invention, which is an example, in which dispersion compensators are arranged in a first portion with an almost equal interval and dispersion compensators are arranged after a point on the way with smaller intervals. In the first portion of the fiber transmission line, since worsening of the waveform is produced more strongly by dispersion than by SPM, dispersion compensators are arranged with an almost equal interval and after influences of SPM have been increased, they are arranged with smaller intervals. However positions, where the dispersion compensators are arranged in practice, can be changed in some extent, depending on positions of optical relays and relay intervals.

Further, heretofore, a method is proposed, by which fiber in a transmission line has a slight normal dispersion and transmission is effected while suppressing both worsening of the waveform in the transmission line and nonlinear effects such as four light wave mixing, etc. by effecting dispersion compensation by using periodically abnormal dispersion fiber. The method for arranging dispersion compensators according to the present invention can be applied also to arrangement of dispersion compensation fiber in such a dispersion compensated transmission.

Figure 12:
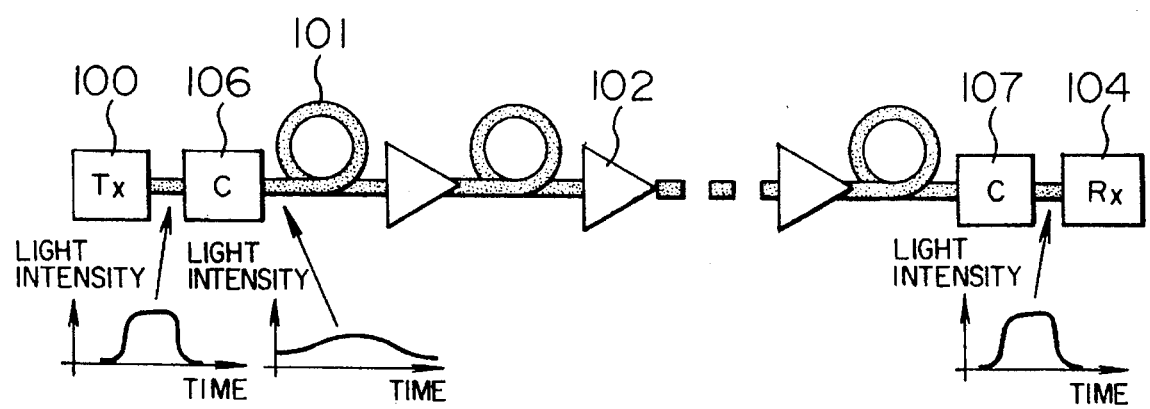
FIG. 12 is a diagram showing a construction representing a eighth embodiment of the present invention.

FIG. 12 is a diagram showing the construction of a eighth embodiment of the present invention. In the present embodiment there are disposed dispersion compensators 106 and 107 at two positions, i.e. directly after the optical transmitter 100 and directly before the optical receiver 104, respectively. The dispersion compensator 106 has an effect to input signals to the transmission fiber after having given light waveform to be transmitted remarkable dispersion, deformed satisfactorily the light waveform and reduced variations in intensity. For this reason it is possible to reduce significantly influences of SPM on the transmitted waveform. By this method the suppression of SPM can be obtained e.g. by transmitting signals after having increased the width of the waveform to be transmitted to a value more than 1.5 times as great as original one. It is possible to restore the transmitted waveform by receiving it at the receiving end after having compensated the amount of dispersion of the dispersion compensator 106 or the dispersion compensator 106 and the transmission line by means of the dispersion compensator 107. It is possible also to divide these dispersion compensators into several and to dispose them in the transmission line, dispersed therein.

Figure 13:
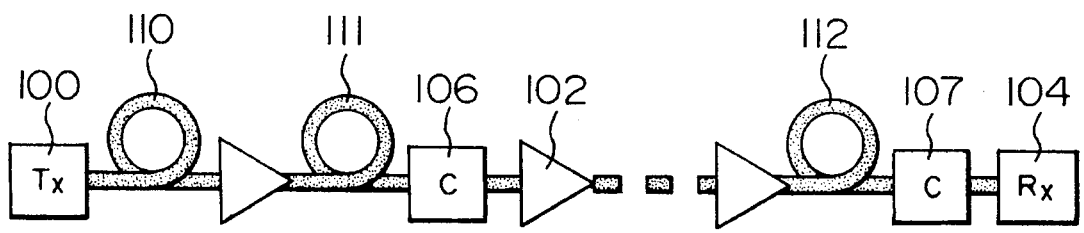
FIG. 13 is a diagram showing a construction representing a ninth embodiment of the present invention.

FIG. 13 is a diagram showing the construction of a ninth embodiment of the present invention. In the present embodiment it is supposed that the dispersion of optical fibers 110,111 and 112 constituting different fiber sections fluctuates in a certain extent. In the prior art dispersion compensated transmission, fluctuations in the amount of dispersion of the optical fiber are not taken into account at all. In case where no dispersion compensation is effected, in such a transmission system, the transmission distance when all the amounts of dispersion of optical fibers are minimum (on the negative dispersion side) is the smallest transmission distance. On the contrary, by the present method, dispersion compensation is effected so that an expected value of the total amount of dispersion including dispersion compensators disposed in the transmission line is a positive dispersion (abnormal dispersion). In this way, since the waveform after the transmission is subjected to waveform distortion in the compression direction, it is possible to increase the smallest transmission distance. On the contrary, in case where mean dispersion of the transmission line is occasionally on the positive dispersion side (abnormal dispersion), the transmission distance can be decreased by the dispersion compensation. However there is no problem, if this value is greater than the smallest transmission distance of the transmission line. Such an optimum value of the amount of dispersion compensation is such a value that worsenings of the waveform after the transmission are in accordance with each other in two cases where all the amounts of dispersion of different optical fibers are minimum and where all the amounts of dispersion of different optical fibers are maximum. At this time the smallest transmission distance can be maximum.

Figure 14:
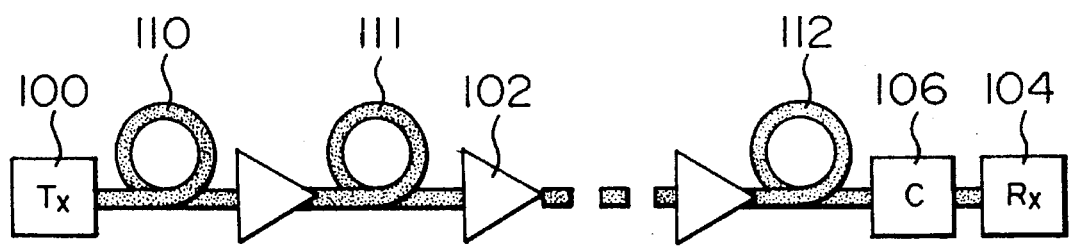
FIG. 14 is a diagram showing a construction representing a tenth embodiment of the present invention.
Figure 15:
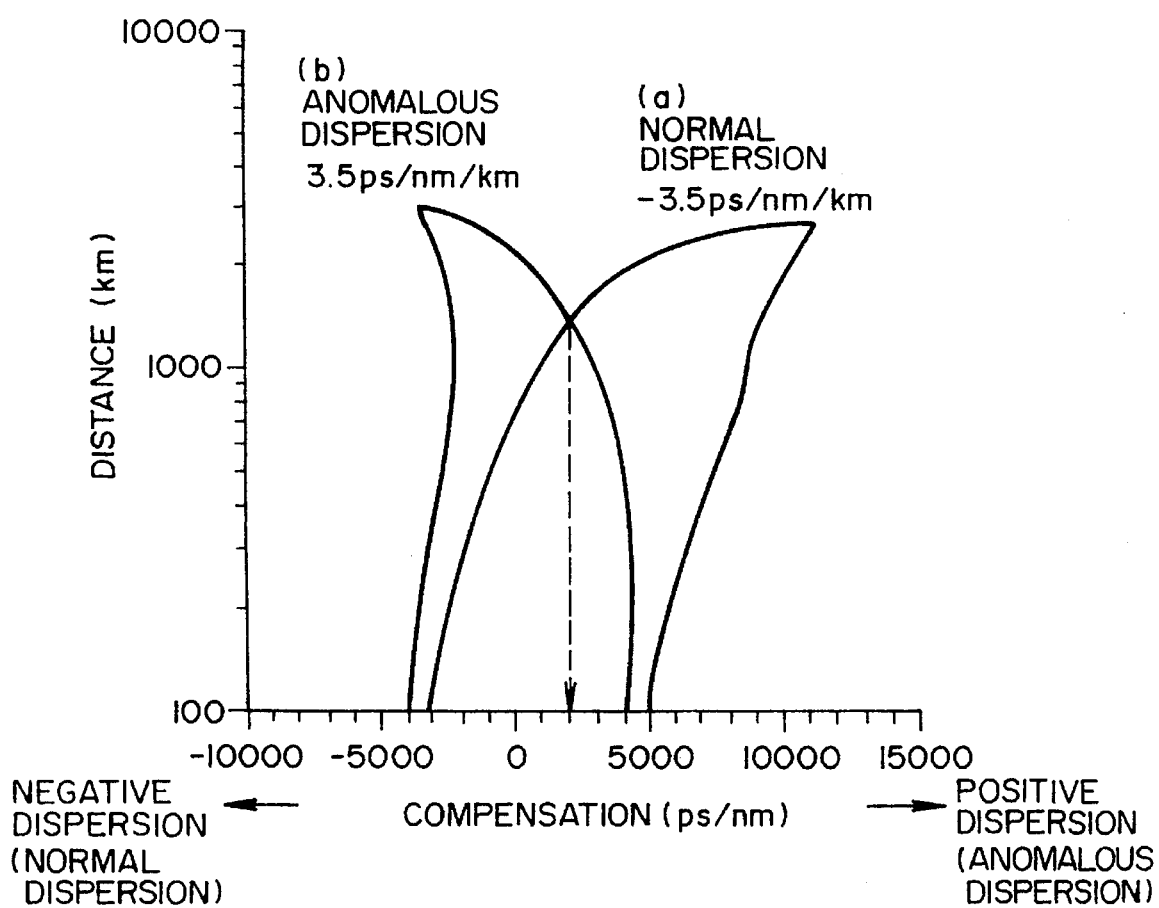
FIG. 15 indicates a relationship between the amount of dispersion compensation and the transmission distance.

FIG. 14 shows a tenth embodiment of the present invention, which is an example, particularly in which only one dispersion compensator 106 is arranged before the optical receiver 104. FIG. 15 shows variations in transmittable distance, when the amount of dispersion of the dispersion compensator 106 is varied. In the calculation, it is supposed that bit rate is 5 Gbps and fiber section length $l = 100$ km and that the amount of dispersion of optical fiber fluctuates in an extent of $|D| \leq 3.5$ ps/nm/km and the limit of transmission is defined to be a point where the waveform after the transmission is widened by about 25%. Two curves in the figure show limits of transmission in cases where all the optical fibers have an amount of dispersion of −3.5 ps/nm/km and where all the optical fibers have an amount of dispersion of ±3.5 ps/nm/km, respectively, and in all the other cases the transmittable distance is longer than in either one of the cases. Consequently a region below the two curves represents distances, for which transmission can be guaranteed however strongly the amount of dispersion fluctuates. From the figure it can be confirmed that the smallest transmission distance is increased by effecting dispersion compensation on the abnormal dispersion side (on the right side in the figure), contrarily to the fact that the smallest transmission distance is about 700 km, in case where no dispersion compensation is effected. It is known that the smallest transmission distance can be longest particularly by setting the amount of dispersion at the intersection of the two curves (in the neighborhood of 2000 ps/nm in FIG. 15). This is just such an amount of dispersion that worsenings of the waveform are approximately in accordance with each other in the two cases where all the amounts of dispersion of different optical fibers are minimum and where all the amounts of dispersion of different optical fibers are maximum.

Further, particularly when the transmittable distance in case where all the amounts of dispersion of different optical fiber sections are minimum (negative dispersion or normal dispersion side) and the amount of dispersion compensation is zero is represented by L (700 km in FIG. 15) and a positive dispersion compensation, with which transmission is possible over the distance L in case where all the amounts of dispersion of different optical fiber sections are maximum is represented by C (about 3500 ps/nm in FIG. 1), it is possible to increase the smallest transmission distance by setting the amounts of dispersion compensation of the optical dispersion compensators between 0 and C.

Further, in the case where a number of dispersion compensators are contained, as indicated in FIG. 13, the amount of dispersion compensation of each of the dispersion compensators can be determined as follows. The amount of dispersion compensation C of the relevant dispersion compensator can be determined so that the worsening of the waveform in case where all the amounts of dispersion of optical fiber sections from the optical transmitters 100 to the relevant dispersion compensator are minimum is approximately in accordance with the worsening in waveform in case where all the amounts of dispersion are maximum. All the amounts of compensation C can be determined without any contradiction by determining them one after another, as indicated above, starting from the dispersion compensator closest to the optical transmitter 100 in an order of increasing distance therefrom, and the smallest transmission distance at this time is longest. The dispersion compensators may be arranged either with an equal interval or with unequal intervals so that the interval decreases with decreasing distance from the receiving end, as described previously.

A method called zero dispersion wavelength transmission is also studied, by which transmission is effected by choosing a zero dispersion wavelength, for which the amount of dispersion of the transmission line is zero on the average in an optical fiber transmission. In such a zero dispersion wavelength transmission, heretofore it was not conceived to effect dispersion compensation. This is because heretofore it was thought that worsening of the transmitted waveform could be eliminated by effecting transmission by using a zero dispersion wavelength. On the contrary, in a reference > Technical Reports On Electronic Communication OCS93-24, by Kikuchi, et al., Electronic Communication Information Society (1993), it is shown that significant worsening is produced in received waveform by influences of SPM, in case where the amount of dispersion of the transmission line fluctuates. Since such worsening of the waveform is produced by deviation of the amount of dispersion of the transmission line, it is possible to cancel it by inserting dispersion compensators. For the amount of compensation of the dispersion compensators, although the value satisfying Eq. (1) described previously is most suitable, an effect can be obtained with an amount of compensation in a region from 0 to a value about twice as great as the value given by Eq. (1).

Figure 16A:
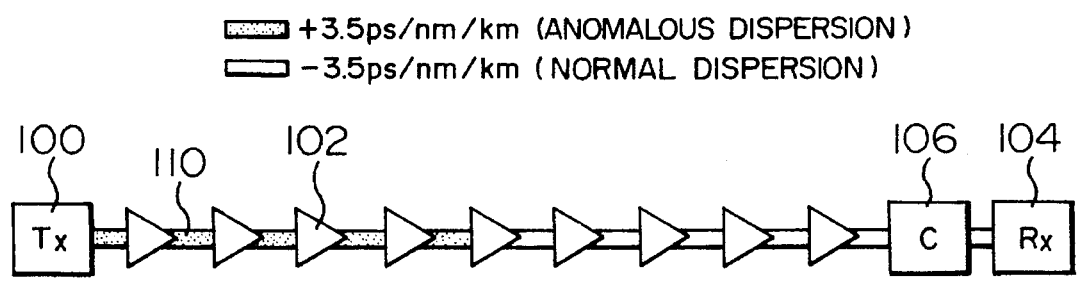
FIGS. 16A and 16B show the worst dispersion arrangements in the zero dispersion wavelength transmission.
Figure 16B:
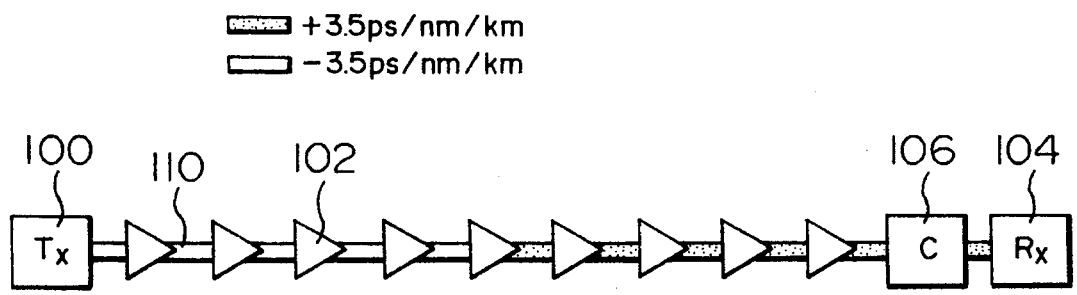

In the zero dispersion wavelength transmission described above, even in the case where the amount of dispersion of optical fiber fluctuates in a certain extent, it is possible to increase the smallest transmission distance by using dispersion compensation. In the zero dispersion wavelength transmission the two cases give rise to the worst dispersion arrangement, one of which is the case where the first half transmission section of the transmission line has the greatest amount of dispersion, while the second half transmission section has the smallest amount of dispersion, as indicated in FIG. 16A, and the other of which is the case where the first half transmission section of the transmission line has the smallest amount of dispersion, while the second half transmission section has the greatest amount of dispersion, as indicated in FIG. 16B. In other cases the transmission distance is at least longer than either of those indicated in FIGS. 16A and 16B. Consequently it is possible to increase the smallest transmission distance to the greatest by setting the amount of compensation of the dispersion compensator 106 so that transmission distances or worsenings in waveform after the transmission in the two cases indicated in FIGS. 16A and 16B are equal to each other. It is possible to use a plurality of dispersion compensators also by the present method.

Since influences of SPM can be cancelled by setting amounts of dispersion compensation of dispersion compensators so as to satisfy Eq. 1, even if light output intensity is varied, received waveform is not varied. Therefore effects can be obtained that it becomes easier to set a discrimination level in the optical receiver and that phase margin of the received waveform is increased. Further, since effects of SPM can be neglected, an effect can be obtained that design of a transmission system becomes easier.

Further, since worsening of the waveform of the neighborhood of the receiving end produced by SPM accumulated during transmission can be compensated with a high efficiency by the fact that arrangement interval between dispersion compensators is smaller in the neighborhood of the receiving end than in the neighborhood of the transmitting end, an effect to increase transmission distance can be obtained. In addition an effect to minimize the number of necessary dispersion compensators by arranging dispersion compensators at such positions that amounts of worsening in waveform directly before different dispersion compensators are in accordance with each other.

Furthermore, since it is possible to reduce variations in intensity of the transmitted waveform by disposing dispersion compensators at two positions directly after the optical transmitters and directly before the optical receiver and transmitting signals after having deformed sufficiently light waveform by the first dispersion compensator, an effect to reduce influences of SPM can be obtained.

In case where the amount of dispersion of optical fibers constituting different fiber sections fluctuates in a certain extent, dispersion compensation is effected so that an expected value of the total amount of dispersion including the dispersion compensators in the transmission line is a positive dispersion (anomalous dispersion). Since the smallest transmission distance of the transmission line is limited usually in the case where all the amounts of dispersion of the transmission line fluctuate on the negative dispersion side, it is possible to increase the smallest transmission distance of the transmission system by dispersion compensation on the positive dispersion side. Particularly, when amounts of dispersion compensation are so set that worsenings of the waveform are approximately in accordance with each other in two cases where all the amounts of dispersion of different optical fibers are minimum and where all the amounts of dispersion of different optical fibers are maximum, an effect can be obtained that the smallest transmission distance of the transmission system is maximum.

Also in the case where transmission is effected by using a zero dispersion wavelength of the transmission line, an effect to reduce worsening of the waveform by SPM and to increase the transmission distance by cancelling deviations of the amount of dispersion of the transmission line by dispersion compensation. Further, even in the case where the amount of dispersion fluctuates in a certain extent, an effect to increase the smallest transmission distance of the transmission system can be obtained by dispersion compensation on the positive dispersion side.

We claim:

1. An optical transmission system having a total transmission distance L comprising an optical transmitter transmitting intensity modulated optical signals; an optical fiber transmission line; an optical receiver; and at least one optical dispersion compensator; wherein, denoting light intensity in an optical fiber at a point Z far from said optical transmitter by a distance z by $P(z)$ and an amount of dispersion from the point Z to said optical receiver (including dispersion of said optical dispersion compensator) by $D(z)$, a position of said optical dispersion compensator and an amount of dispersion are so set that a value obtained by integrating a product $P(z) \cdot D(z)$ from $z=0$ to L is approximately zero.

2. An optical transmission system having a total transmission distance L comprising:

an optical transmitter transmitting intensity modulated optical signals;

an optical fiber transmission line; an optical receiver; and at least one optical dispersion compensator, wherein, denoting (1) light intensity in an optical fiber at a point Z displaced from said optical transmitter by a distance z by $P(z)$, (2) a point directly after an i-th optical dispersion compensator by $Z_i$ and (3) an amount of dispersion from the point Z to the point $Z_i$ (including dispersion of optical dispersion compensators) by $D_i(z)$, where i is an index number for the dispersion compensators counting from the optical transmitter, positions of said optical dispersion compensators and amounts of dispersion are so set that values obtained by integrating products $P(z) \cdot D_i(z)$ from $z=0$ to $Z_i$ are approximately zero for all i.

3. An optical transmission system comprising:

an optical transmitter transmitting intensity modulated optical signals;

an optical fiber transmission line;

optical amplifiers used as repeaters dividing said optical fiber transmission line into N (N>1) fiber sections;

an optical receiver; and an optical dispersion compensator disposed before said optical receiver, wherein an amount of dispersion C of said dispersion compensator is set so as to be approximately $\{1/(aL)-(N+1)/(2N)\}$ times as great as an amount of dispersion B of said transmission line, where a is a loss factor of said optical fiber, and L is a total transmission distance.

4. An optical transmission system comprising:

an optical fiber transmission line including at least one optical fiber transmission section;

an optical transmitter, connected to a first end of the optical fiber transmission line, transmitting intensity modulated optical signals, having wavelengths approximately corresponding with a mean zero dispersion wavelength of the optical fiber transmission line; and an optical receiver, connected to a second end of the optical fiber transmission line; and at least one optical dispersion compensator inserted between the optical transmitter and the optical receiver, the at least one optical dispersion compensator having a dispersion characteristic opposite to that of the optical fiber transmission line.

5. An optical transmission system having a total transmission distance L comprising at least an optical fiber transmission line; and optical transmitter transmitting intensity modulated optical signals, whose wavelength is approximately in accordance with a mean zero dispersion wavelength of said optical fiber transmission line; an optical receiver; and at least one optical dispersion compensator; wherein, denoting light intensity in said optical fiber at a point Z far from said optical transmitter by a distance z by $P(z)$ and an amount of dispersion from said point Z to said optical receiver (including dispersion of said light dispersion compensator) by $D(z)$, a position of said light dispersion compensator and an amount of dispersion are so set that a value obtained by integrating a product $P(z) \cdot D(z)$ from $z=0$ to L is approximately zero.

* * * * *

UNITED STATES PATENT AND TRADEMARK OFFICE
CERTIFICATE OF CORRECTION

PATENT NO. : 5,606,445
DATED : 25 February 1997
INVENTOR(S) : Nobuhiko KIKUCHI et al.

It is certified that error appears in the above-indentified patent and that said Letters Patent is hereby corrected as shown below:

| Column | Line | |
|---|---|---|
| 1 | 37 | Change "pro-portionally" to --proportionally--. |
| 2 | 17 | Change "it" to --the object--. |
| 2 | 25 | Change "It" to --The object--. |
| 2 | 27 | Before "arrangement" insert --an--. |
| 2 | 29 | Change "It" to --The object--. |
| 2 | 31 | Before "waveform" insert --a--. |
| 2 | 33 | Before "case" insert --the--. |
| 2 | 36 | Change "it" to --the object--. |
| 2 | 38 | Change "being" to $--l_1$, where $l_1--$. |
| 2 | 41 | Change "it" to --the object--. |
| 3 | 43 | Change "compensator" to --compensators--. |
| 2 | 41 | Change "Furthermore" to --Furthermore, --. |

UNITED STATES PATENT AND TRADEMARK OFFICE
CERTIFICATE OF CORRECTION

PATENT NO. : 5,606,445
DATED : 25 February 1997
INVENTOR(S) : Nobuhiko KIKUCHI et al.

It is certified that error appears in the above-indentified patent and that said Letters Patent is hereby corrected as shown below:

| Column | Line | |
|---|---|---|
| 5 | 20 | Change "for" to --far--. |

Signed and Sealed this

Twenty-second Day of July, 1997

Attest:

BRUCE LEHMAN

Attesting Officer

Commissioner of Patents and Trademarks